United States Patent
Smith et al.

(10) Patent No.: US 10,152,053 B1
(45) Date of Patent: Dec. 11, 2018

(54) PASSENGER CLASSIFICATION-BASED AUTONOMOUS VEHICLE ROUTING

(71) Applicant: Cubic Corporation, San Diego, CA (US)

(72) Inventors: Gavin Smith, Crawley (GB); Steffen Reymann, Guildford (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/029,218

(22) Filed: Jul. 6, 2018

Related U.S. Application Data

(60) Provisional application No. 62/529,126, filed on Jul. 6, 2017.

(51) Int. Cl.
| | |
|---|---|
| *G01C 22/00* | (2006.01) |
| *G05D 1/00* | (2006.01) |
| *G01C 21/34* | (2006.01) |
| *G06Q 10/02* | (2012.01) |
| *G06Q 50/30* | (2012.01) |

(52) U.S. Cl.
CPC ....... *G05D 1/0027* (2013.01); *G01C 21/3438* (2013.01); *G01C 21/3453* (2013.01); *G05D 1/0088* (2013.01); *G06Q 10/02* (2013.01); *G05D 2201/0213* (2013.01); *G06Q 50/30* (2013.01)

(58) Field of Classification Search
CPC .............. G05D 1/0027; G05D 1/0088; G05D 2201/0213; G01C 21/3453; G01C 21/3438; G06Q 10/02; G06Q 50/30
USPC ................................ 701/23, 25, 28; 340/435
See application file for complete search history.

(56) References Cited

U.S. PATENT DOCUMENTS

| | | | | |
|---|---|---|---|---|
| 9,984,572 | B1 * | 5/2018 | Newman | G08G 1/141 |
| 2004/0039504 | A1 * | 2/2004 | Coffee | B28C 5/422 |
| | | | | 701/482 |
| 2011/0052004 | A1 * | 3/2011 | Lee | G06K 9/00221 |
| | | | | 382/103 |
| 2012/0041675 | A1 * | 2/2012 | Juliver | G06Q 10/08 |
| | | | | 701/465 |
| 2013/0231824 | A1 * | 9/2013 | Wilson | G05D 1/0246 |
| | | | | 701/26 |

(Continued)

OTHER PUBLICATIONS

International Search Report and Written Opinion dated Aug. 24, 2018 in related application No. PCT/US2018/041121, all pages.

*Primary Examiner* — Shardul D Patel
(74) *Attorney, Agent, or Firm* — Kilpatrick Townsend and Stockton, LLP

(57) ABSTRACT

An autonomous vehicle (AV) fleet management system includes a communications interface, one or more processors, and a memory that stores instructions that cause the processors to receive, a request for a ride using an AV from a wireless communication device of a user. The request may include a pick-up location of the user. The instructions also cause the processors to identify demographic information related to the user, determine a vulnerability score and a priority of the user based at least in part on the demographic information, and receive location information from a plurality of AVs in a fleet of AVs. The instructions further cause the processors to identify a particular AV from the fleet of AVs based at least in part on the vulnerability score, the priority, the pick-up location of the user, and the location of the particular AV and cause the particular AV to pick-up the user.

20 Claims, 4 Drawing Sheets

(56) References Cited

U.S. PATENT DOCUMENTS

| | | | |
|---|---|---|---|
| 2016/0161266 A1* | 6/2016 | Crawford | G01C 21/34 |
| | | | 701/25 |
| 2016/0370194 A1* | 12/2016 | Colijn | G01C 21/343 |
| 2017/0123421 A1* | 5/2017 | Kentley | G01C 21/26 |
| 2017/0153714 A1 | 6/2017 | Gao et al. | |
| 2017/0343375 A1* | 11/2017 | Kamhi | H04W 4/40 |
| 2018/0061242 A1* | 3/2018 | Bavar | B60W 50/082 |
| 2018/0136656 A1* | 5/2018 | Rasmusson, Jr. | G01C 21/3638 |
| 2018/0202822 A1* | 7/2018 | DeLizio | G01C 21/3438 |
| 2018/0211541 A1* | 7/2018 | Rakah | G08G 1/005 |

* cited by examiner

PASSENGER CLASSIFICATION-BASED AUTONOMOUS VEHICLE ROUTING

CROSS-REFERENCES TO RELATED APPLICATIONS

This application claims the benefit of U.S. Provisional Application No. 62/529,126, entitled "PASSENGER CLASSIFICATION-BASED AUTONOMOUS VEHICLE ROUTING", filed on Jul. 6, 2017, the entire contents of which are hereby incorporated by reference.

BACKGROUND OF THE INVENTION

Public transit and rideshare programs are common means of transportation for getting around populous areas. However, such forms of transportation have shortcomings associated with matching a rider to their ideal vehicle situation. For instance, conventional rideshare and public transit systems do not consider whether passengers in different groups would likely be a good match for sharing a particular transit vehicle. This can create various safety and comfort concerns for a passenger who is in a bad part of town or who must share a ride with a person who makes them uncomfortable. These safety and comfort problems (even if just perceived by the passenger) may be further exacerbated in autonomous vehicle (AV) settings, due to the absence of a driver or ticket inspector within the vehicle.

BRIEF SUMMARY OF THE INVENTION

Embodiments of the present invention provide systems and methods related to autonomous vehicle fleet management. Specifically, embodiments of the present invention use information from multiple sources beyond just information provided directly from a driver or rider to enable informed vehicle/passenger matching to increase both the actual and perceived safety and comfort level of each passenger. The systems and methods described here not only consider possible interactions between multiple passengers (and potentially the drivers themselves), but also may enable routing and pick-up determinations to be made based on the safety and/or comfort level of a passenger prior to pick-up based on any number of factors, such as a crime rate, time of day, or demographics and/or behavior of people proximate to the passenger.

According to one embodiment, an autonomous vehicle (AV) fleet management system is provided. The system may include a communications interface that is in communication with a fleet of AVs, one or more processors, and a memory configured to store instructions. The instructions, when executed, may cause the one or more processors to receive, using the communications interface, a request for a ride using an AV from a wireless communication device of a user. The request may include a pick-up location of the user. The instructions, when executed, may further cause the one or more processors to identify demographic information related to the user and determine a vulnerability score and a priority of the user based at least in part on the demographic information. The instructions, when executed, may also cause the one or more processors to receive, using the communications interface, location information from a plurality of AVs in a fleet of AVs, identify a particular AV from the fleet of AVs based at least in part on the vulnerability score, the priority, the pick-up location of the user, and the location of the particular AV, and cause the particular AV to pick-up the user.

In another embodiment, an AV fleet management system may include a communications interface that is in communication with a fleet of AVs, one or more processors; and a memory configured to store instructions. The instructions, when executed, may cause the one or more processors to receive a plurality of requests for rides using an AV. Each of the plurality of requests may be provided by a wireless communication device of one of a plurality of users. Each request may include a pick-up location of the a particular one of the plurality of users that is associated with the request. The instructions, when executed, may further cause the one or more processors to identify demographic information related to each of the plurality of users and to determine a vulnerability score and a priority for each of the plurality of users based at least in part on the demographic information of each of the particular users. The instructions, when executed, may also cause the one or more processors to receive location information from a plurality of AVs in a fleet of AVs and identify a particular AV from the fleet of AVs for each of the plurality of users based at least in part on the vulnerability score, the priority, the pick-up location of each of the plurality of users, and the location of each of the plurality of AVs. Users having higher priorities may be assigned an AV from the plurality of AVs with earlier pick-up times than users with lower priorities. The instructions, when executed, may further cause the one or more processors to cause each particular AV to pick-up at least one of the plurality of users.

In another embodiment, a method for controlling a fleet of AVs is provided. The method may include receiving a plurality of requests for rides using an AV. Each of the plurality of requests may be provided by a wireless communication device of one of a plurality of users. Each request may include a pick-up location of the a particular one of the plurality of users that is associated with the request. The method may also include identifying demographic information related to each of the plurality of users, determining a vulnerability score and a priority for each of the plurality of users based at least in part on the demographic information of each of the particular users, and receiving location information from a plurality of AVs in a fleet of AVs. The method may further include identifying a particular AV from the fleet of AVs for each of the plurality of users based at least in part on the vulnerability score, the priority, the pick-up location of each of the plurality of users, and the location of each of the plurality of AVs. Users having higher priorities may be assigned an AV from the plurality of AVs with earlier pick-up times than users with lower priorities. The method may also include causing each particular AV to pick-up at least one of the plurality of users.

BRIEF DESCRIPTION OF THE DRAWINGS

A further understanding of the nature and advantages of various embodiments may be realized by reference to the following figures.

DETAILED DESCRIPTION OF THE INVENTION

Figure 1:
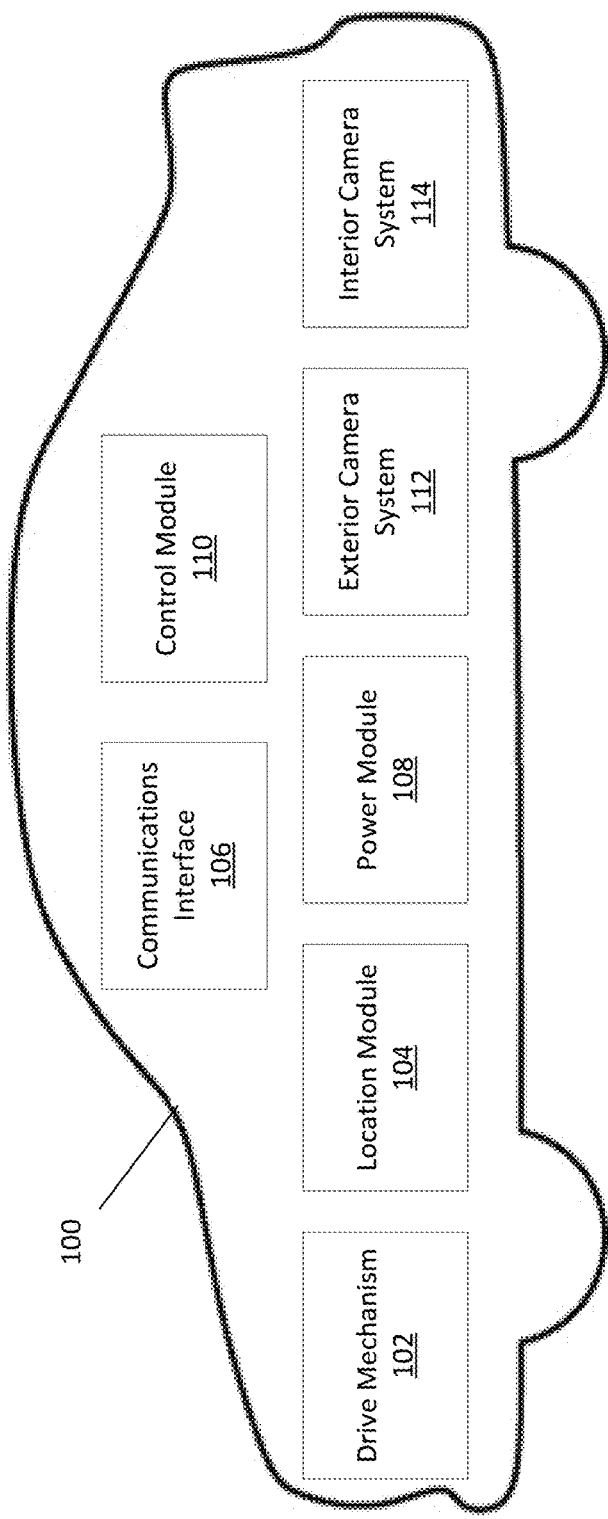
FIG. 1 depicts a schematic of an autonomous vehicle according to embodiments.

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the spirit and scope of this disclosure.

Embodiments of the invention(s) described herein are generally related to multi-occupancy autonomous vehicles' capability to determine optimal route, stops, and pick-up of specific passengers requesting service based on a number of classification criteria. That said, a person of ordinary skill in the art will understand that alternative embodiments may vary from the embodiments discussed herein, and alternative applications may exist. It will also be appreciated that while the disclosure and claims are primarily directed to autonomous vehicle embodiments, the concepts described herein may be applied to driver-operated vehicles to further increase the safety and comfort level of passengers in such applications.

Autonomous buses and other autonomous vehicles (AVs) have potential security issues (even if just perceived by the passenger) due to the lack of a driver or ticket inspector on the vehicle. As noted above, embodiments of the invention(s) described herein enable multi-occupancy autonomous vehicles to determine optimal route, stops, and pick-up (or not) of specific passengers requesting the service based on a number of classification criteria. In this way, the service can be used safely by a large number of passengers, some of which may exhibit particular vulnerabilities that would make it potentially unsafe to travel with particular types of other passengers. Put differently, embodiments described herein allow a fleet of autonomous multi-occupancy vehicles to efficiently and safely serve a large community of passengers who may have different requirements or exhibit specific vulnerabilities that the system must cater for.

At a high level, an embodiment may be implemented as follows: 1) A passenger requires pick-up from a specific location. This request can be made from a dedicated mobile app the passenger may have, from a webpage, or any other communication channel to the AV fleet management system (e.g., a text message, proprietary communication means, social media, etc.). 2) The AV fleet management system (e.g., implemented by one or more servers) receives the request together with additional data that allows it to determine the priority of the passenger pick-up request. Examples of the additional data include a location of the passenger, a time of day and day of week, profile information sent from the passenger app as part of the pick-up request (e.g., age, gender, disabilities, etc.), profile information as above retrieved from a passenger database via a unique ID sent from the passenger phone (or other communication device) as part of the pick-up request; e. Information retrieved from environmental sensors such as cameras that are in the location of the passenger (this can be used, for example, to determine approximate age, gender of the passenger) or from cameras in other passing vehicles from the autonomous vehicle fleet, crime data associated with an area around the pick-up location, and/or environmental information, such as weather. 3) A dedicated algorithm combines the information above to determine vulnerability and priority of pick-up for the particular passenger. In some embodiments, different combinations of some or all of this data (e.g., the factors above) may be weighted differently, depending desired functionality. 4) A vehicle can then be instructed (e.g., via communication from the one or more servers implementing the fleet management system) to pick up the passenger on their route, taking into account the profile of passengers already on board.

By implementing the flow above, or similar flow in alternative embodiments, embodiments of the present invention(s) include various novel features. For example, autonomous vehicle routing, prioritization, and pick-up decision-making can be based on individual passengers vulnerability classification. This ensures that vulnerable passengers may be picked up promptly and placed in vehicles in which they will be most comfortable and safe. Embodiments also enable vehicle/passenger decision-making to be based on passenger classification criteria such as age, gender, group size, etc. Classification data can be set by passengers, such as by inputting this data into a website and/or a mobile application for storage in a dedicated passenger profile, and/or may be automatically derived from closed circuit television (CCTV) from various autonomous vehicles, such as those passing the requested passenger and/or other video sources. A decision-making algorithm can factor in external parameters such as weather, time of day, day of week, relative security/crime rate of a requested stop location, etc. This enables passengers in unsafe areas (such as due to bad weather, crime rate, etc.) to be prioritized to ensure they remain safe. The decision-making algorithm can take a system view and route a fleet of vehicles to allow all passenger groups to be treated fairly and picked up in reasonable time according to their classification. Pickup events can be stored in a database and used to automatically anticipate vulnerable passenger requirements when similar conditions occur in future.

Embodiments of the invention may provide a number of advantages over conventional systems. For example, embodiments can allow deployment of multi-occupancy autonomous vehicle fleets while addressing a wide passenger base and their concerns. Embodiments can make use of autonomous vehicles safe for vulnerable passengers by matching the passengers with vehicles (and possibly other passengers) that best meet their individual needs and/or desired criteria. Additionally, embodiments can optimize routing of an AV vehicle fleet for multitude of passenger needs.

It will be noted that the autonomous vehicles may include any of a variety of vehicles that may be controllable or partially controllable to effectuate the techniques descried herein. Accordingly, autonomous vehicles may refer to self-driving vehicles, partially-automated vehicles, and/or other vehicle types. Furthermore, in some embodiments, autonomous vehicles may be driven, owned, and/or managed by private citizens, public transportation authorities, commercial fleets, and/or other entities.

Turning now to FIG. 1, a system diagram of one embodiment of an autonomous vehicle 100 is shown. The autonomous vehicles 100 described herein may be used as full-time and/or part time public and semi-public transit options. For example, the autonomous vehicles 100 may be busses, taxis, rideshare vehicles, and/or other public and/or hired vehicles. These vehicles may be routed to pick up any number of passengers, either to predetermined locations (such as set transit stops) and/or locations that are selected by the passengers during and/or prior to the ride. Each of the autonomous vehicles 100 may define a passenger compartment that is designed for seating or otherwise transporting one or more passengers.

Each autonomous vehicle 100 may include a drive mechanism 102, such as a motor, engine, transmission, or other mechanism for putting the autonomous vehicle 100 into motion. It will be appreciated that drive mechanism 102 may be fueled by gasoline, diesel, electricity, hydrogen, natural gas, biofuel, and/or any other suitable energy source. Drive mechanism 102 may also include one or more steering mechanisms, such as a steering wheel, to adjust a heading of the autonomous vehicle 100. Autonomous vehicle 100 may also include a location module 104. Location module 104 may include a location determining device, such as a global positioning satellite (GPS) system that can determine a present location of the autonomous vehicle 100. In some embodiments, the location module 104 may also be able to determine a path or likely path of the autonomous vehicle 100. The path or likely path may be determined by a user entering a destination location into the GPS system, with the location module 104 calculating and providing a travel route to the user and/or the drive mechanism 102 of autonomous vehicle 100. For example, if the autonomous vehicle 100 is in an automated state, the location module 104 may determine a destination location and a path on which to travel to arrive at the destination. The path may be based on a quickest path, which may involve retrieving current and/or historical traffic data to determine a likely quickest path, a path having a shortest distance, a path that avoids highways, toll roads, or specific locations, and/or some combination of the above factors and/or additional criteria. The path may be used to generate a set of directions that may be provided to the drive mechanism to determine a speed and/or direction of travel of the autonomous vehicle 100. In some embodiments, the destination and/or routing information may be provided to the autonomous vehicle 100 by a fleet management system.

Autonomous vehicle 100 may also include a communications module 106. Communications module 106 may be configured to communicate with external devices using one or more wireless communications protocols. For example, cellular signals such as 3G, 4G, LTE, and/or other cellular data networks may be used in conjunction with communications module 106. Other wireless protocols such as Wi-Fi, Bluetooth, WiMAX, and/or other wireless communications protocols may also be used. Communications module may be used to interface the autonomous vehicle 100 with one or more external devices, such as other autonomous vehicles, a fleet management system, manually driven vehicles, mobile devices such as laptops, mobile phones, tablet computers, and the like, and/or other electronic devices. This allows autonomous vehicle 100 to send data related to its speed, heading, and/or expected route to other vehicles and systems, as well as receive data, such as traffic information, destination data, routing data, rider information, data from other autonomous vehicles, and/or other data. Such information may be used by the autonomous vehicle 100 (sometimes at command of a fleet management system) to alter routes, change vehicle/passenger matches, determine original matches, etc. In some embodiments, the autonomous vehicle 100 may receive one or more commands, such as commands that activate an ignition mechanism of the autonomous vehicle and/or cause the autonomous vehicle 100 to adjust a speed, heading, and/or route.

Autonomous vehicle 100 may also include a power module 108 that includes one or more batteries. Power module 108 may be configured to supply power to the various electronic systems, such as the location module 104, communications module 106, and a control module 110. In some embodiments, such as those where autonomous vehicle 100 is an electric and/or hybrid vehicle, power module 108 may be used to power the drive mechanism 102 of autonomous vehicle 100. In some embodiments, the power module 108 may be configured to supply power to a portion of the autonomous vehicle 100 at all times, even when the vehicle is parked, without an occupant, and/or in an inactivated state. For example, the power module 108 may supply a small amount of power to the communications module 108 and/or the control module 110 that allows the autonomous vehicle 100 to receive a wakeup command from a fleet management system and/or other remote start mechanism. Such a wakeup command may be received using the communications module 106 and may instruct the control module 110 to activate the autonomous vehicle 100, such as by activating an ignition mechanism of the autonomous vehicle 100. This allows a traffic control center to control an autonomous vehicle 100 even when the autonomous vehicle 100 has been parked and turned off.

Control module 110 may include one or more processing units that are specially programmed to execute very specific software commands that are used to control the communication interface, drive mechanism, the location module, and/or other electronic systems of the autonomous vehicle 100. Control module 110 may be configured to perform a number of functions associated with controlling the autonomous vehicle 100. For example, upon receipt of a command to turn on autonomous vehicle 100, control module 110 may cause an ignition mechanism, such as a starter of the autonomous vehicle 100, to activate, turning the autonomous vehicle 100 on. This allows a fleet management system to utilize vehicles that are not already on the roadway to pick up passengers. In some embodiments, commands may be received from the fleet management system that cause the drive mechanism 102 and/or other systems of the autonomous vehicle 100 to brake or otherwise decelerate to a lower speed, accelerate, change direction, and/or adjust a route of the autonomous vehicle 100.

In some embodiments, the autonomous vehicle 100 may be selected to receive the route and/or destination for a particular passenger or number of passengers based on the autonomous vehicle 100 being parked and/or unoccupied, in addition to in or in the alternative to being within a predefined radius of a passenger or number of passengers who have requested rides. In embodiments where the autonomous vehicle 100 is parked and/or unoccupied, the transmission of the route (and/or a separate transmission) may include an activation command that causes the autonomous vehicle 100 to move onto a roadway and/or into traffic. In some embodiments, the autonomous vehicle 100 may be powered off (except for the communications interface 106 and/or the control module 110) and the activation command may cause the autonomous vehicle 100 to activate an ignition mechanism of the autonomous vehicle 100 to turn on an engine, motor, and/or other component of the drive mechanism 102.

Once one or more autonomous vehicles have been identified, the fleet management system may send the route and/or destination of one or more passengers the identified autonomous vehicles. The autonomous vehicle 100 receives the route of the passenger (or group of passengers) using the communications interface 106. The route of the passenger include a current location of the passenger, a pick up location of the passenger, a route to the pick-up location, and/or an expected route to the final destination of the passenger. In some embodiments, the route of the autonomous vehicle 100 may be provided by a GPS system of the location module 104, such as when a passenger of the autonomous vehicle 100 has selected a destination location, which may be provided to the autonomous vehicle 100 by a fleet management system. In other embodiments, the location module 104 and control module 110 may calculate an estimated path based on the current location, current heading, and/or speed of the autonomous vehicle 100, such as based on GPS coordinates provided by the location module 104 and/or other information provided by vehicle sensors, such as accelerometers, velocity sensors, compasses and the like.

In some embodiments, additional information may be used to determine an ideal route. For example, traffic information related to roadways between the autonomous vehicle 100 and the pick-up location and/or end destination may be provided to the autonomous vehicle 100. This traffic information may include current traffic conditions and/or historical traffic data associated with roadways between the various locations. The control module 110 may use this information to determine a time and/or distance remaining until the pick-up location and/or destination and/or estimated time to arrival (ETA) to such a location. This information may be provided to the fleet management system using the communication interface 106. The information may then be provided to the passenger's mobile device by the fleet management system, although in some embodiments the autonomous vehicle may communicate this information directly to the passenger's mobile device.

In some embodiments, updated route information may be provided to the autonomous vehicle 100. For example, the updated route information may include data related to cancelling or modifying the request, traffic information, weather information, or other data, which may trigger a rerouting of the autonomous vehicle 100. In other embodiments, information associated with one or more other passengers may prompt the fleet management system to adjust a route of an autonomous vehicle 100 and/or command a different autonomous vehicle to pick up a particular passenger. For example, the fleet management system may analyze the current and future ridership of each vehicle 100 and match up the passenger(s) associated with the request with a vehicle that has current and/or known future riders that will share the vehicle 100 with the passenger. If the current and/or identified future riders are not compatible with the passenger for some reason (such as due to demographic, accessibility, behavioral, mood, and/or other reasons) then the fleet management system 202 may match the passenger up with the different chicle 100. In some embodiments, the determination that an upcoming passenger is not compatible with one or more current and/or future identified riders of a particular vehicle 100 may be made after the passenger has been matched with the vehicle. For example, a group of current riders may become aggressive or unruly after boarding the vehicle. This behavior may be detected, for example, though video analytics of a feed from the interior camera system 114 of the vehicle. Conversely, the existing passengers may be calm and orderly while an upcoming passenger may be determined to be intoxicated, aggressive, or otherwise incompatible with the existing passengers. This may be determined, for example, using the exterior camera system 112 of one or more vehicles 100 in the fleet and/or by the camera 108 near the pick-up location. The autonomous vehicle 100 may make further adjustments to its speed, direction, and/or route based on the updated route information, as well as re-match a passenger with a new vehicle and cancel the previous vehicle. In some embodiments, this updated route information may be received by autonomous vehicle 100 after the autonomous vehicle 100 has already made one or more adjustments to accommodate a particular passenger.

While described with many of the speed, route, and/or direction commands being controlled by control module 110 of autonomous vehicle 100, it will be appreciated that a central control system, such as the fleet management system, may be able to remotely control a number of autonomous vehicles 100 to accommodate the need of the various passengers. In such embodiments, the central control system may be a specialized mainframe or other special purpose computer that may be configured to monitor and control a number of autonomous vehicle locations in real-time using GPS coordinates provided by the autonomous vehicles and/or using traffic beacons, and/or other location sensors. The central control system may then gather traffic data, such as density, speeds, accidents, detours, locations of the autonomous vehicle 100 (both on the road and/or parked), passenger locations/destinations, weather data, crime data, and/or other information and determine how to best manipulate the speeds, routes, and/or directions of the autonomous vehicles 100 to clear a path for the prioritized vehicle based on the available information. Additionally, it will be appreciated that in some embodiments the passengers may directly communicate with the autonomous vehicles 100 using mobile devices to alert the autonomous vehicles 100 of any necessary location, route, and/or timing changes.

In some embodiments, the autonomous vehicle 100 may include one or more image capture systems. For example, an exterior camera system 112, such as a closed circuit television (CCTV) system may be mounted to and/or within an exterior of the body of the autonomous vehicle 100 such that an area outside of the autonomous vehicle 100 may be monitored. This allows images to be captured of people and objects near an exterior of the autonomous vehicle 100. Such imaging may be used to detect whether there are people near the vehicle 100, a number of people, the mood (aggressiveness/calmness, etc.) of the people, etc. For example, the images may be sent to the central control system, which may analyze the images. In some embodiments, autonomous vehicle 100 may include an interior camera system 114. Interior camera system 114 may be mounted within the passenger compartment of the autonomous vehicle 100 and may be designed to monitor any passengers within the autonomous vehicle 100. The number of passengers and/or behavior of any existing passengers may be determined based on the video feed. The information that is identified from the video feed(s) may be used by the central control system to determine how to match vehicles 100 with one or more passengers. For example, the central control system may determine not to match a particular passenger with an autonomous vehicle 100 due to current passengers (detected using the interior camera system 114) that may make the particular passenger uncomfortable. As just one example, the particular passenger may be a female traveling alone and the autonomous vehicle 100 may already have a couple male passengers who are being quite rowdy and/or are intoxicated. The central control system may determine that a different autonomous vehicle 100 should be sent to pick up the female, as she may feel/be unsafe and/or uncomfortable being by herself and sharing the autonomous vehicle 100 with the unruly men. As another example, video analysis from the exterior camera systems 112 of one or more vehicles 100 (which may or may not include the vehicle 100 that is to pick up a passenger) may determine that a passenger may be near a group of rowdy people (such as those who haven't submitted ride requests) and may prefer to be picked up sooner. The central control system may then route a nearest particular autonomous vehicle 100 to pick up the passenger to get the passenger into the vehicle 100 and away from the group of rowdy people as soon as possible.

Figure 2:
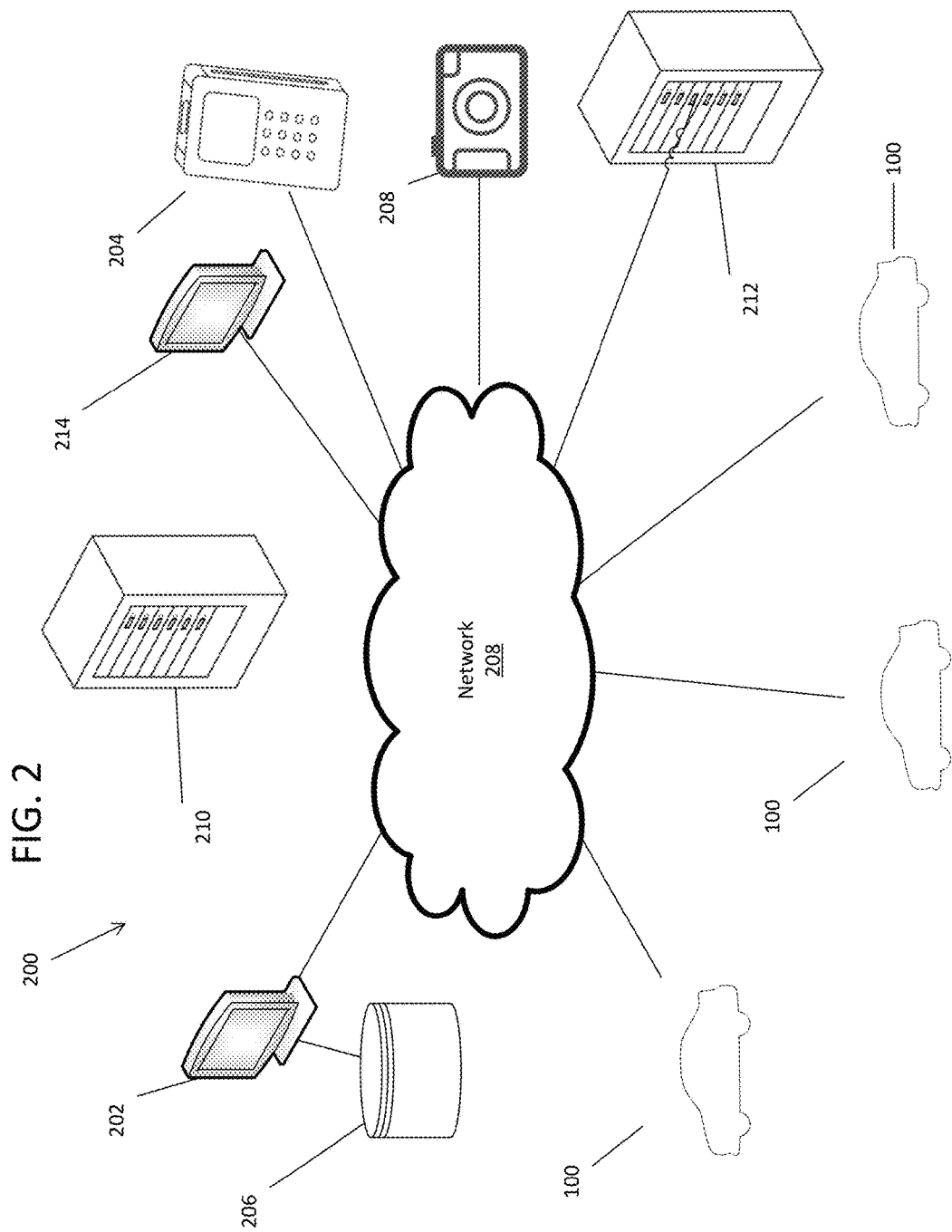
FIG. 2 depicts a system for managing a fleet of autonomous vehicles according to embodiments.

FIG. 2 depicts a system 200 for controlling a fleet of autonomous vehicles, such as autonomous vehicle 100. System 200 may include a fleet management system 202. Fleet management system 202 may include one or more servers or other specialized computing devices that are designed to manage the logistical operations of a fleet of autonomous vehicles 100. For example, fleet management system 202 may be configured to match the various autonomous vehicles 100 within the fleet with one or more passenger requests received from mobile devices 204 of the passengers. The fleet management system 202 may also provide destination and/or routing information to each of the autonomous vehicles 100 for picking up and/or dropping off each of the passengers. For example, one or more passenger mobile devices 204 may send requests for rides to the fleet management system 202. The requests may include pick-up location and/or a drop off location for a particular passenger or group of passengers, as well as an identifier of the mobile device 204. In some embodiments, the request may also include a number of passengers associated with the request, profile information (such as demographic information) associated with some or all of the passengers, a request time, accessibility information (such as information related to disabilities, age-related considerations, and/or other special needs that may need to be taken into account in matching a passenger with a particular autonomous vehicle) associated with some or all of the passengers and/or other information that may be relevant to matching passengers with autonomous vehicles 100. For example, a passenger may need a wheelchair accessible vehicle 100. Such information may be inputted by a passenger into the request and/or such information may be stored on a mobile application associated with the mobile device 204 such that the information may be appended to each request submitted by the passenger. In other embodiments, the information may be identified by exterior camera systems 112 and/or cameras 208 positioned at points of interest, such as those near common pick-up areas. In some embodiments, rather than including this information in the request or from video analytics, some or all of this information may be stored in a passenger profile. This profile may be maintained by the fleet management system 202 and may be stored in a memory device, such as a network attached storage (NAS) 206. Upon receiving a ride request, the fleet management system 202 may retrieve the profile from the storage 206 and use the retrieved information in matching autonomous vehicles 100 with passengers.

Fleet management system 202 may be coupled with a number of information sources that allow the fleet management system 202 to make better decisions that increase the efficiency of the fleet of autonomous vehicles 100, as well as increase the level of safety, comfort, and overall satisfaction of passengers that utilize the fleet of autonomous vehicles 100 for transportation. For example, the fleet management system 202 may be coupled with one or more camera systems mounted on and/or within some or all of the autonomous vehicles 100 within the fleet. For example, some or all of the vehicles 100 may include exterior camera system 112 and/or interior camera system 114. Video and/or still feeds from the camera systems may be analyzed by the fleet management system 202 to determine the number of passengers or other people in or around a particular autonomous vehicle 100. Additionally, imaging analytics may be used to determine demographic information associated with each of the identified persons and/or a general behavior or mood of the persons. For example, the image analytics may determine that one or more identified persons are acting in an aggressive manner and/or in a manner consistent with intoxication and the fleet management system 202 may match a passenger with a particular autonomous vehicle based on this determination.

The fleet management system 202 may also be in communication with imaging equipment near pick-up locations. For example, designated pick-up locations, such as public transit stops, outside of hotels, restaurants, event arenas, and/or other points of interest may include cameras 208 that provide video and/or still images to the fleet management system 202. These images may be analyzed to determine a states of the environment around a particular passenger's pick-up location. For example, a number of people, a behavior of the people, current weather, at the pick-up location, and/or other factors may be detected based on these video analytics. Additionally, the analytics may be used to identify a number of people that are associated with a particular ride request, and in some embodiments luggage or other belongings, which enables the fleet management system 202 to match the request with an autonomous vehicle that has sufficient passenger and/or luggage space to accommodate the needs of the passenger(s). For example, three passengers may be headed to the airport or a golf course and may have golf clubs and/or luggage with them. The ride request may only indicate the passenger who made the requests, and possibly an indication that additional passengers are joining, but may not indicate that the passengers have large bags with them. The video analytics provide the fleet management system 202 the ability to determine that a sufficiently large vehicle 100 is needed to accommodate the passengers and their luggage and may match the request with a particular vehicle 100 based on this information.

The fleet management system may also be in communication with one or more other external sources of data that may be used to help determine a priority level for a particular passenger or group of passengers. For example, the fleet management system 202 may be in communication with a crime information database 210. Crime database may include records of all crime in a particular area. The data may include specific incidences of crime, classification of each crime, a specific location of each crime, statistics related to crimes, such as frequency of crime in general and/or specific types of crime in a particular area, statistics related to demographics of perpetrators and/or victims of the crimes, time of day of the crimes, and/or other data related to crime. The fleet management system 202 may query the crime information database 210 (or receive updated records that may be stored at storage 206) to determine crime rates associated with each ride request. For example, the fleet management system 202 may receive a ride request to pick up a passenger at a particular location. The fleet management system 202 may retrieve and/or receive crime information associated with the particular location. The crime information may be based on the exact location, an area within a particular radius of the location, a neighborhood within which the location resides, and/or other location criteria. In some embodiments, the crime data may also be based on demographic information associated with the passenger. For example, if the passenger is a young male, the crime information may be based on crimes that involve young male victims. The crime information may also be based on a time of day of the pick-up request, as the crime rate in an area may vary greatly based on the time of day and may be safe during daytime hours and very unsafe at night. The fleet management system 202 may analyze he crime information in association with the pick-up request and possibly the demographic information of the passenger.

Based on this analysis, the fleet management system 202 may assign each passenger and/or request with a vulnerability score that may be used in assigning each passenger and/or request with a priority score. For example, passengers in higher crime areas and/or having demographics matching a vulnerable subset of the population may be deemed to be highly vulnerable and may be assigned higher priority scores. The fleet management system 202 may then ensure that passengers with higher priority scores are matched with vehicles 100 that will pick them up sooner, such as by sending the closest available vehicle 100 to pick up the passenger. In some embodiments, the vulnerability and/or priority score may be sufficiently high that the fleet management system 202 may activate a non-operational vehicle 100 that is in the area of the passenger pick-up location in order to speed up the pick-up process, which may decrease the real or perceived threat of a particular passenger. For example, the fleet management system 202 may send an activation command to a non-operational vehicle 100 that cases the ignition mechanism of the vehicle to enter an operational state. The fleet management system 202 may then issue a command that causes the drive mechanism 102 of the newly activated vehicle to cause the vehicle 100 to enter a roadway and proceed to the pick-up location.

The fleet management system 202 may also be in communication with a weather information system 212, which may provide real-time weather updates and forecasts to the fleet management system 202. The fleet management system may query the weather information system 212 for weather information for a particular pick-up location. The weather information may be used by the fleet management system 202 to determine a vulnerability score and/or a priority score for each passenger. For example, passengers that are being picked in areas with worse weather may be determined to be more vulnerable and/or higher priority than passengers in nice weather.

In some embodiments, the fleet management system 202 may also maintain records of current passengers and future passengers that have been scheduled for pick-up by each of the autonomous vehicles. To preserve resources and to help ensure more efficient transportation routing, passengers from different parties may be grouped together in a single vehicle 100. When a particular ride request is received, the fleet management system 202 may analyze the current and future ridership of each vehicle 100 and match up the passenger(s) associated with the request with a vehicle that has current and/or known future riders that will share the vehicle 100 with the passenger. If the current and/or identified future riders are not compatible with the passenger for some reason (such as due to demographic, accessibility, behavioral, mood, and/or other reasons) then the fleet management system 202 may match the passenger up with the different vehicle 100. In some embodiments, the determination that an upcoming passenger is not compatible with one or more current and/or future identified riders of a particular vehicle 100 may be made after the passenger has been matched with the vehicle. For example, a group of current riders may become aggressive or unruly after boarding the vehicle. This behavior may be detected, for example, though video analytics of a feed from the interior camera system 114 of the vehicle. Conversely, the existing passengers may be calm and orderly while an upcoming passenger may be determined to be intoxicated, aggressive, or otherwise incompatible with the existing passengers. This may be determined, for example, using the exterior camera system 112 of one or more vehicles 100 in the fleet and/or by the camera 208 near the pick-up location. The fleet management system 202 may take such information into account and cancel the pick-up of the upcoming passenger by the original vehicle 100 and instead route a different vehicle 100 to pick up the upcoming passenger. The adaptability of such matching systems ensures that the fleet management system 202 can make the most informed matching decisions, even as the information available to the fleet management system 202 updates.

Fleet management system 202 may also be configured to monitor real-time and historical traffic around an area, such as a municipal area. Fleet management system 202 may also be configured to relay information, such as route information, current speeds, current headings, and/or average speeds to autonomous vehicles 100 for use in altering routes and pick-up schedules to ensure that a most optimum matching and routing schedule is maintained. Fleet management system 202 may also be configured to receive data from other remote systems 214. For example, a school or event system, which may be operated by a private entity and/or a municipality, may provide information to the fleet management system 202 that allows the fleet management system 202 to adjust vehicle/passenger matching, routing options, and/or pick-up order efficiency due to a particular event, such as a sporting event or school getting out.

The various devices of system 200 may be in communication with one another via one or more networks 216. For example, network 216 may include one or more local area networks (LAN) and/or other wired and/or wireless networks. Network 216 may utilize one or more of Wi-Fi, ZigBee, Bluetooth™, Bluetooth™ Low Energy, a cellular communications protocol such as 3G, 4G, or LTE, and/or any other wireless communications protocol. It will be appreciated that one or more different network connections may be used in accordance with the invention, and that the use of a single network 208 to enable communications is merely one example of such configurations. For example, each component may be communicatively coupled with other components using a separate network for one or more of the connections. The connections between the various devices may be secure. This may be done using encryption over a public network, a private network, a secure virtual private network (VPN), or any other method of securing a connection.

Figure 3:
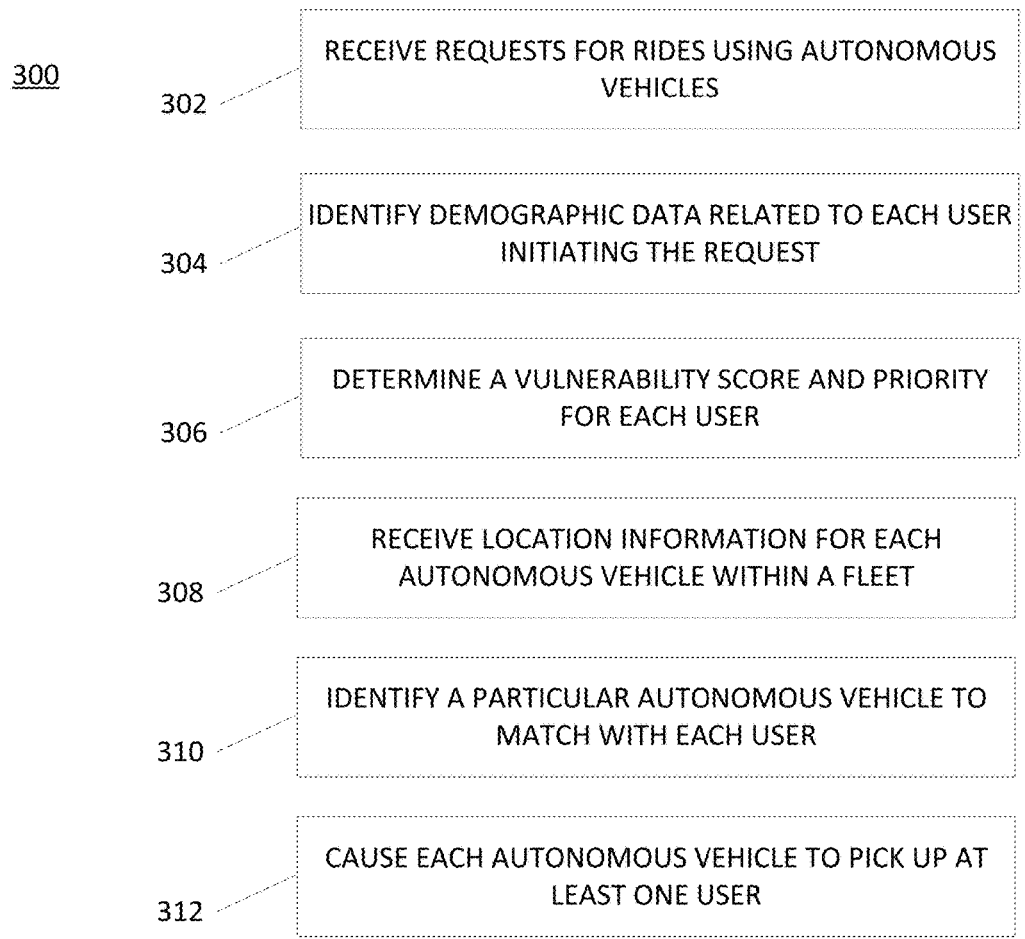
FIG. 3 is a flowchart depicting a process for managing a fleet of autonomous vehicles according to embodiments.

FIG. 3 is a flowchart depicting a process 300 for operating a fleet management system according to one embodiment. Process 300 may be performed by a fleet management system, such as fleet management system 202 described herein. Process 300 may begin at block 302 by receiving a plurality of requests for rides using an autonomous vehicle, such as autonomous vehicle 100. Each request may be provided by a wireless communication device, such as mobile device 204, of one of a plurality of users. This request can be made from a dedicated mobile app the passenger may have, from a webpage, or any other communication channel to the autonomous vehicle fleet management system (e.g., a text message, proprietary communication means, social media, etc.). Each request may include a pick-up location of a particular one of the users that is associated with the request. The requests may also include an identifier of the user and/or the mobile device that submitted the request.

At block 304, classification data, such as demographic information and/or other information related to each of the plurality of users is identified. In some embodiments, this classification information may be included in the received requests. The received information may include a location of the passenger; demographics of the passenger, size of group of passengers, time of day and/or day of week of the scheduled pick-up, information retrieved from environmental sensors such as cameras that are in the location of the passenger, cameras within the vehicle, and/or from exterior cameras in other passing vehicles from the fleet (this sensor data can be used, for example, to determine approximate age, gender of the passenger, environmental information such as weather, crime data, and/or other data. In some embodiments, rather than (or in addition to) being received as part of the ride requests, this information may be associated with a user account stored on and/or accessible by the fleet management system. For example, the identifier of the user and/or the mobile device may be used by the fleet management system to retrieve the information, such as demographic information, that is associated with the particular user (or group of users, if known) associated with a particular request.

In some embodiments, classification data may also include user accessibility requirements associated with at least one of the plurality of users. This accessibility information may be used not only in a determination of the vulnerability score or priority of the user, but may also be used to match the user with a vehicle having required equipment or resources to match his needs. For example, a person in a wheelchair may need to be matched with a wheel-chair accessible vehicle. This accessibility information may come from the request, a passenger profile, and/or camera/sensor data.

In some embodiments, the classification data may include information related to whether any additional people are within a predetermined threshold distance of the pick-up location for at least one of the plurality of users. For example, analysis of a video feed from one or more cameras from one or more vehicles of the fleet and/or a camera located proximate to the pick-up location may be used to detect additional people. The analysis may also be used to determine demographic information of the additional people, a mood of the additional people, and a level of aggressiveness of the additional people and/or other information associated with the additional people. This information may affect the vulnerability score and/or the priority for a particular user. For example, a user in a crowded location may be assigned a low priority and/or vulnerability score, while a passenger who is alone or with a small group of strangers in a relatively secluded area may be assigned a high priority and/or vulnerability score.

A vulnerability score and a priority may be determined for each of the plurality of users based at least in part on the demographic information of each of the particular users at block 306. For example, while collecting a number of ride requests, the fleet management system may assign each requesting passenger or group of passengers with a vulnerability score that is indicative of a level of risk that passenger is currently in or could potentially be put in based on the classification data. For example, users who are currently in risky environments or users who could feel unsafe if placed alone in vehicles will people of opposite genders or certain behavior types may be considered to have high vulnerability scores, while people in groups, larger or more aggressive people, and/or people in relatively safe environments may be assigned low vulnerability scores. The level of vulnerability may then be tied to a priority for each passenger or group of passengers. This priority may determine which vehicle will be sent to pick up each passenger or group of passengers. For example, passengers with the highest priorities may be matched with the nearest available vehicles to ensure they are picked up first. In some embodiments, vehicles that are currently not in an operational state may be activated and routed to high priority passengers to decrease the passenger's wait time. Any combination of the data and factors described herein (possibly along with data not disclosed herein) may be used to generate vulnerability scores and assign priorities for each of the passengers. The fleet management system may execute a decision-making algorithm that takes a system view and routes vehicles from the fleet in a manner that allows all passenger groups to be treated fairly and picked up in reasonable time according to their classification.

A record of each pickup event can be stored in a database and used to automatically anticipate vulnerable passenger requirements when similar conditions occur in future. For example, in some embodiments, the fleet management system may determine that a particular one of the users had additional members in a ride party. Demographic information associated with the additional members may be identified and stored in a profile associated with the requesting user. This stored demographic information may be used in a future interaction to match the particular user with a vehicle based on the user's prior behavior, needs, and requests. In some embodiments the determination that the user had additional members in his ride party is based on video analytics of an interior of the vehicle associated with the user's ride.

At block 308, location information is received from a plurality of autonomous vehicles in a fleet of autonomous vehicles. The location information may be received directly from the vehicles, such as from global positioning satellite (GPS) data from the vehicles. In some embodiments, the vehicles may be in communication with one or more beacons that are operated by the fleet management system. Communications between the vehicles and the beacons may be used by the fleet management system to determine a location of each of the vehicles.

At block 310, a particular autonomous vehicle is identified from the fleet of vehicles for each of the plurality of users based at least in part on the vulnerability score, the priority, the pick-up location of each of the plurality of users, and the location of each of the plurality of autonomous vehicles. For example, users are typically matched with vehicles that are near the pick-up location associated with the ride request. Users having higher priorities are often assigned a vehicle with earlier pick-up times than users with lower priorities. Upon matching vehicles with passengers, the fleet management system may cause the matched vehicles to pick-up at least one of the users at block 312. For example, the system may send commands that include pick-up and/or drop off destinations and/or routing information to each of the vehicles. In some embodiments, a notification may be sent to each passenger's mobile device that indicates that a vehicle is on its way. The notification may also include identification information associated with the vehicle, such as a license plate number, make, model, color, etc. the notification may also include an estimated pick-up and/or drop off time.

In some embodiments, causing the vehicles to pick up passengers may involve sending routing and destination instructions to drivers of rideshares and other multiple occupancy vehicles. to optimize routes and/or provide a more safe environment for ride share applications. For example, the fleet management system may send instructions to a mobile application of a driver's mobile device that instruct the driver where to go. Therefore, it will be appreciated that within the present disclosure the term autonomous vehicle may be construed to include both computer controlled vehicles as well as vehicles that are operated by drivers, such as rideshare vehicles in which a fleet management system (such as one or more servers) instruct, command, and/or otherwise direct the human drivers on a particular route to pick-up, drop off, and/or otherwise transport passengers.

In some embodiments, after causing a particular vehicle to start pick-up a particular passenger (but prior to actually picking up the passenger), the fleet management system may receive additional/updated information that causes the system to determine that the particular vehicle does not meet the requirements of the user. For example, accessibility information may be received after initially matching the user with the vehicle. As another example, video analytics may determine that the passenger and/or other current passengers that would otherwise share the vehicle at the same time are acting in a manner that is likely to make one or both of the parties uncomfortable if forced to ride together. Another example may involve an earlier passenger having too many riders in his party such that not enough seats are available for an upcoming passenger and/or group of passengers. This information may be determined based on video analytics from video of the interior of the vehicle, exterior of the vehicle, and/or near the pick-up location. In such instances of mismatched passengers, the fleet management system may cancel the latter passenger's matched vehicle and instead cause a different vehicle to pick-up the latter passenger. In such cases, the latter passenger may be sent a notification of the change, including similar information as included in the earlier notification.

Figure 4:
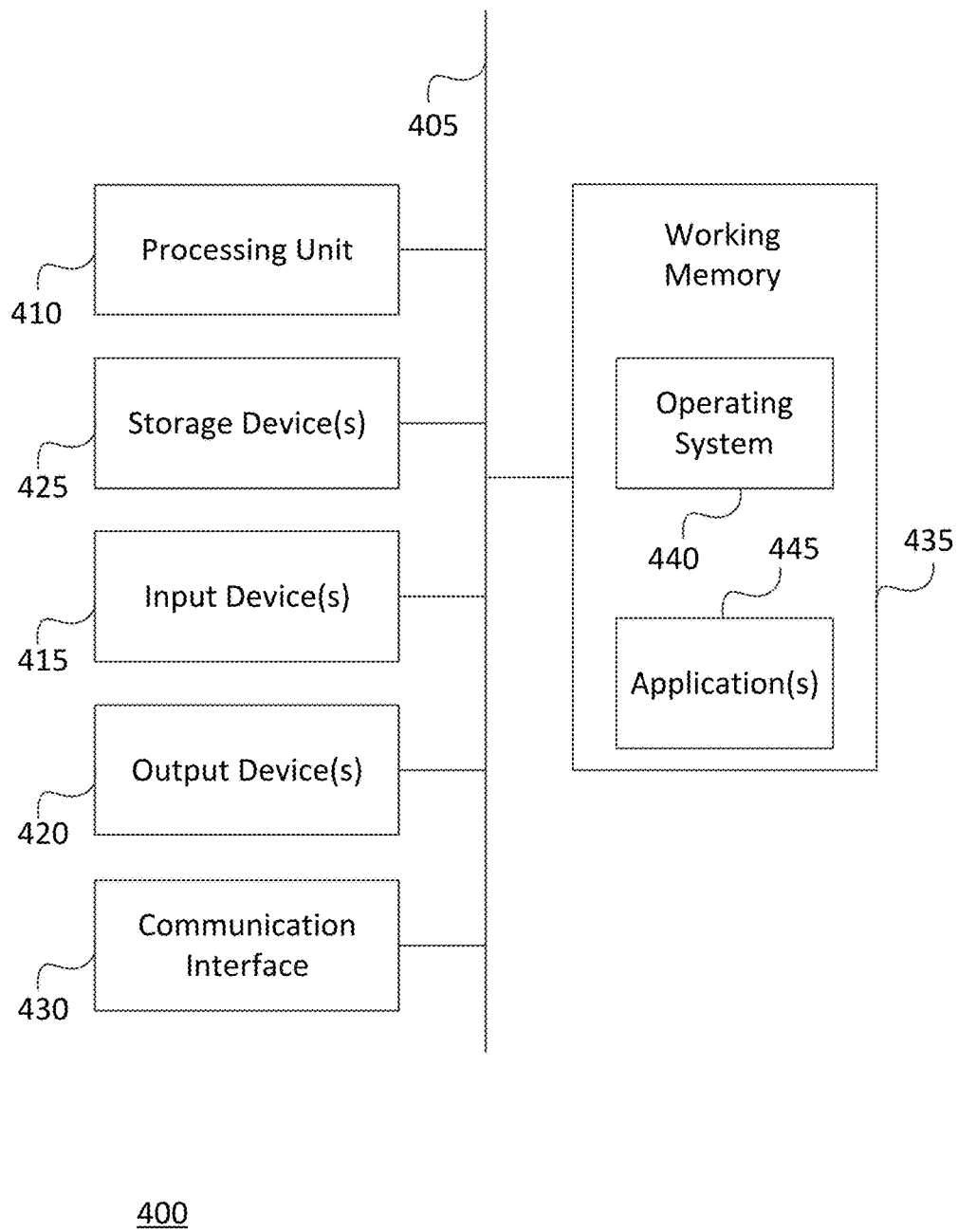
FIG. 4 is a block diagram of a computer system according to embodiments.

A computer system as illustrated in FIG. 4 may be incorporated as part of the previously described computerized devices. For example, computer system 400 can represent some of the components of the autonomous vehicle 100, fleet management system 202, and the like described herein. FIG. 4 provides a schematic illustration of one embodiment of a computer system 400 that can perform the methods provided by various other embodiments, as described herein. FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include a processing unit 410, including without limitation one or more processors, such as one or more special-purpose processors (such as digital signal processing chips, graphics acceleration processors, and/or the like); one or more input devices 415, which can include without limitation a keyboard, a touchscreen, receiver, a motion sensor, a camera, a smartcard reader, a contactless media reader, and/or the like; and one or more output devices 420, which can include without limitation a display device, a speaker, a printer, a writing module, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communication interface 430, which can include without limitation a modem, a network card (wireless or wired), an infrared communication device, a wireless communication device and/or chipset (such as a Bluetooth™ device, an 502.11 device, a Wi-Fi device, a WiMAX device, an NFC device, cellular communication facilities, etc.), and/or similar communication interfaces. The communication interface 430 may permit data to be exchanged with a network (such as the network described below, to name one example), other computer systems, and/or any other devices described herein. In many embodiments, the computer system 400 will further comprise a non-transitory working memory 435, which can include a RAM or ROM device, as described above.

The computer system 400 also can comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 410, applications 445, etc.) Further, connection to other computing devices such as network input/output devices may be employed.

Some embodiments may employ a computer system (such as the computer system 400) to perform methods in accordance with the disclosure. For example, some or all of the procedures of the described methods may be performed by the computer system 400 in response to processing unit 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the storage device(s) 425. Merely by way of example, execution of the sequences of instructions contained in the working memory 435 might cause the processing unit 410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processing unit 410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 425. Volatile media include, without limitation, dynamic memory, such as the working memory 435. Transmission media include, without limitation, coaxial cables, copper wire, and fiber optics, including the wires that comprise the bus 405, as well as the various components of the communication interface 430 (and/or the media by which the communication interface 430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a non-transitory storage device 425 either before or after execution by the processing unit 410.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

The methods, systems, devices, graphs, and tables discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein. As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. An autonomous vehicle (AV) fleet management system, comprising:
   a communications interface that is in communication with a fleet of AVs;
   one or more processors; and
   a memory configured to store instructions thereon that, when executed, cause the one or more processors to:
   receive, using the communications interface, a request for a ride using an AV from a wireless communication device of a user, the request comprising a pick-up location of the user;
   identify demographic information related to the user;
   determine a vulnerability score and a priority of the user based at least in part on the demographic information;
   receive, using the communications interface, location information from a plurality of AVs in a fleet of AVs;
   identify a particular AV from the fleet of AVs based at least in part on the vulnerability score, the priority, the pick-up location of the user, and the location of the particular AV; and
   cause the particular AV to pick-up the user.

2. The autonomous vehicle (AV) fleet management system of claim 1, wherein the memory further comprises instructions that, when executed, cause the one or more processors to:
   identify any current and identified future riders that are scheduled for each of the plurality of AVs whose rides overlap with the user; and
   determine demographic information associated with the any current and identified future riders, and wherein the particular AV is identified from the fleet of AVs based at least in part on the demographic information associated with the any current and identified future riders.

3. The autonomous vehicle (AV) fleet management system of claim 1, wherein the memory further comprises instructions that, when executed, cause the one or more processors to:
   determine whether any additional people are within a predetermined threshold distance of the pick-up location;
   receiving demographic information about the additional people and wherein identifying the particular AV is further based on the demographic information about the additional people.

4. The autonomous vehicle (AV) fleet management system of claim 1, wherein the memory further comprises instructions that, when executed, cause the one or more processors to:
   identify any current and identified future riders that are scheduled that are scheduled to overlap with the user for the particular AV;
   determine demographic information for each of the current and identified future riders;
   determine that at least one of the current and identified future riders should not share the particular AV with the user; and
   issue a command to a different AV from the fleet of AVs to pick-up the user or at least one of the identified future riders based on the determination that at least one of the current and identified future riders should not share the particular AV with the user.

5. The autonomous vehicle (AV) fleet management system of claim 4, wherein the memory further comprises instructions that, when executed, cause the one or more processors to:
   communicate a notification the user that the different AV has been dispatched, wherein the notification comprises an estimated pick-up time for the different AV.

6. The autonomous vehicle (AV) fleet management system of claim 4, wherein the memory further comprises instructions that, when executed, cause the one or more processors to:
   receive a video feed from an interior of the particular AV; and
   analyzing the video feed, wherein determining that at least one of the current and identified future riders should not share the particular AV with the user is based on the analysis of the video feed.

7. The autonomous vehicle (AV) fleet management system of claim 1, wherein the memory further comprises instructions that, when executed, cause the one or more processors to:
   communicate a notification to the wireless communications device of the user that the particular AV has been sent to pick the user up.

8. An autonomous vehicle (AV) fleet management system, comprising:
   a communications interface that is in communication with a fleet of AVs;
   one or more processors; and
   a memory configured to store instructions thereon that, when executed, cause the one or more processors to:
   receive a plurality of requests for rides using an AV, wherein each of the plurality of requests is provided by a wireless communication device of one of a plurality of users, each request comprising a pick-up location of the a particular one of the plurality of users that is associated with the request;

identify demographic information related to each of the plurality of users;

determine a vulnerability score and a priority for each of the plurality of users based at least in part on the demographic information of each of the particular users;

receive location information from a plurality of AVs in a fleet of AVs;

identify a particular AV from the fleet of AVs for each of the plurality of users based at least in part on the vulnerability score, the priority, the pick-up location of each of the plurality of users, and the location of each of the plurality of AVs, wherein users having higher priorities are assigned an AV from the plurality of AVs with earlier pick-up times than users with lower priorities; and cause each particular AV to pick-up at least one of the plurality of users.

9. The autonomous vehicle (AV) fleet management system of claim 8, wherein the memory further comprises instructions that, when executed, cause the one or more processors to:

receive crime data for an area associated with the pick-up location for each of the plurality of users, wherein the vulnerability score and the priority for each of the plurality of users is based in part on the crime data.

10. The autonomous vehicle (AV) fleet management system of claim 8, wherein:

at least one AV from the plurality of AVs picks up multiple of the plurality of users during a single trip.

11. The autonomous vehicle (AV) fleet management system of claim 8, wherein the memory further comprises instructions that, when executed, cause the one or more processors to:

receive weather data in an area associated with the pick-up location for each of the plurality of users, wherein the vulnerability score and the priority for each of the plurality of users is based in part on the weather data.

12. The autonomous vehicle (AV) fleet management system of claim 8, wherein the memory further comprises instructions that, when executed, cause the one or more processors to:

alter a route of at least one of the plurality of AVs to accommodate vehicle requirements of a particular one of the plurality of users.

13. The autonomous vehicle (AV) fleet management system of claim 8, wherein the memory further comprises instructions that, when executed, cause the one or more processors to:

determine that a particular one of the plurality of users had additional members in a ride party;

identify demographic information associated with the additional members;

store the demographic information in a profile associated with the particular one of the plurality of users; and use the stored demographic information in a future identification of a particular AV from the fleet of AVs.

14. The autonomous vehicle (AV) fleet management system of claim 13, wherein:

determining that the particular one of the plurality of users had additional members in a ride party is based on video analytics of an interior of the particular one of the plurality of AVs associated with the particular one of the plurality of users.

15. A method for controlling a fleet of autonomous vehicles (AVs), comprising:

receiving a plurality of requests for rides using an AV, wherein each of the plurality of requests is provided by a wireless communication device of one of a plurality of users, each request comprising a pick-up location of a particular one of the plurality of users that is associated with the request;

identifying demographic information related to each of the plurality of users;

determining a vulnerability score and a priority for each of the plurality of users based at least in part on the demographic information of each of the particular users;

receiving location information from a plurality of AVs in a fleet of AVs;

identifying a particular AV from the fleet of AVs for each of the plurality of users based at least in part on the vulnerability score, the priority, the pick-up location of each of the plurality of users, and the location of each of the plurality of AVs, wherein users having higher priorities are assigned an AV from the plurality of AVs with earlier pick-up times than users with lower priorities; and causing each particular AV to pick-up at least one of the plurality of users.

16. The method for controlling a fleet of autonomous vehicles (AVs) of claim 15, further comprising:

receiving user accessibility requirements associated with at least one of the plurality of users;

wherein identifying the particular AV for the at least one of the plurality of users is based on the accessibility data, and wherein the particular AV for the at least one of the plurality of users has accessibility resources that match the accessibility requirements associated with the at least one of the plurality of users.

17. The method for controlling a fleet of autonomous vehicles (AVs) of claim 15, further comprising:

determining whether any additional people are within a predetermined threshold distance of the pick-up location for at least one of the plurality of users;

receiving demographic information about the additional people and wherein identifying each particular AV is further based on the demographic information about the additional people.

18. The method for controlling a fleet of autonomous vehicles (AVs) of claim 17, wherein:

determining whether any additional people are within a predetermined threshold distance of the pick-up location comprises:

receiving a video feed from one or more of a camera from one or more AVs of the fleet of AVS or a camera located proximate to the pick-up location; and analyzing the video to determine one or more of demographic information of the additional people, a mood of the additional people, and a level of aggressiveness of the additional people; and the priority for the at least one of the plurality of users is determined based at least in part on the demographic information of the additional people, a mood of the additional people, and a level of aggressiveness of the additional people.

19. The method for controlling a fleet of autonomous vehicles (AVs) of claim 15, further comprising:
- after causing a particular AV to pick-up a particular one of the passengers, determining that the particular AV does not meet the requirements of the particular one of the users; and
- cause a different AV of the plurality of AVs to pick-up the particular one of the users.

20. The method for controlling a fleet of autonomous vehicles (AVs) of claim 19, wherein:
- the determination that the particular AV does not meet the requirements of the particular one of the users is based on one or more of the pick-up location, a time of day of the request, a crime rate associated with the pick-up location; weather data for the pick-up location, demographic information associated with current and future identified users of the particular AV, or demographic information associated with additional people proximate to the pick-up location.

* * * * *